(12) United States Patent
Schmid et al.

(10) Patent No.: US 7,135,428 B2
(45) Date of Patent: Nov. 14, 2006

(54) CATALYST SOLUTION FOR IMPLEMENTING ANIONIC LACTAM POLYMERIZATION, METHOD FOR PRODUCTION THEREOF AND POLYAMIDE MOULDING COMPOUND

(75) Inventors: Eduard Schmid, Bonaduz (CH); Heinz Hoff, Tamins (CH); Ornulf Rexin, Felsburg (CH)

(73) Assignee: Ems-Chemie AG, Domat/Ems (CH)

( * ) Notice: Subject to any disclaimer, the term of this patent is extended or adjusted under 35 U.S.C. 154(b) by 0 days.

(21) Appl. No.: 10/937,721

(22) Filed: Sep. 9, 2004

(65) Prior Publication Data
US 2005/0090382 A1      Apr. 28, 2005

(30) Foreign Application Priority Data
Sep. 10, 2003 (DE) .................. 103 41 811

(51) Int. Cl.
*B01J 31/00* (2006.01)
(52) U.S. Cl. ...................... 502/167; 502/171
(58) Field of Classification Search ............... 502/167, 502/171
See application file for complete search history.

(56) References Cited

U.S. PATENT DOCUMENTS

| | | | | |
|---|---|---|---|---|
| 2,782,231 A | * | 2/1957 | Redmon | 562/423 |
| 3,896,052 A | * | 7/1975 | Lockwood et al. | 502/167 |
| 4,125,523 A | * | 11/1978 | Bacskai | 528/312 |
| 4,587,305 A | * | 5/1986 | Garner et al. | 525/331.9 |
| 4,595,746 A | * | 6/1986 | Gabbert et al. | 528/312 |
| 2003/0130113 A1 | * | 7/2003 | Schmid et al. | 502/167 |

FOREIGN PATENT DOCUMENTS

| | | | |
|---|---|---|---|
| DE | 196 03 305 A1 | * | 8/1997 |
| EP | 0 905 166 A | | 3/1999 |
| EP | 0 872 508 B1 | | 8/2000 |
| WO | WO 00/58387 A | | 5/2000 |
| WO | WO 00/58378 | * | 10/2000 |
| WO | WO 01/46293 A1 | * | 6/2001 |

OTHER PUBLICATIONS

Basf Intermediates—The Right Partner For Progressive Chemistry Worldwide; BASF Intermediates; 12.2 Harnstoffe Ureas; pp. 162-163.

* cited by examiner

*Primary Examiner*—J. A. Lorengo
*Assistant Examiner*—J. Pasterczyk
(74) *Attorney, Agent, or Firm*—Marshall & Melhorn LLC

(57) ABSTRACT

A catalyst solution for the anionic polymerization of lactones and/or lactams comprises a salt of at least one compound of the general formula I

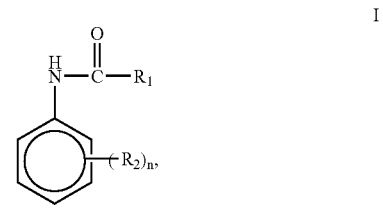

In this formula (I), $R_1$ is H or an aliphatic, cycloaliphatic or aromatic radical with 1 to 12 C atoms which can also have heteroatoms or hetero groups, the radical $R_2$, which is the same or different, is H, halogen, $C_1$–$C_5$-alkyl, ethoxy or wherein said solvation agent S comprises N-methylpyrrolidone, N-octylpyrrolidone, N-cyclohexylpyrrolidone, N-octylcaprolactam, tetrabutyl urea or mixtures thereof methoxy, and n=1, 2 or 3, and wherein the salt is dissolved in an aprotic solvation agent S.

10 Claims, 7 Drawing Sheets

Fig. 1

Table 1. Sodium acetanilide in NOP with varied concentrations

| Test | Molar ratio AA:NOP:NaOMe | T [°C] | m(AA) [g] | m(NOP) [g] | M(NaOMe) [g] | Concentration c [mol/kg] |
|---|---|---|---|---|---|---|
| 1 | 1.05:4.0:1 | 60 | 71.0 | 394.0 | 89.1 | 0.94 |
| 2 | 1.05:3.6:1 | 60 | 73.6 | 369.0 | 93.3 | 1.00 |
| 3 | 1.05:3.0:1 | 60 | 71.0 | 295.95 | 89.1 | 1.15 |
| 4 | 1.05:2.8:1 | 60 | 56.1 | 230.0 | 74.7 | 1.23 |
| 5 | 1.05:2.3:1 | 60 | 56.1 | 190.0 | 74.7 | 1.38 |
| 6 | 1.05:1.5:1 | 60 | 41.0 | 85.4 | 51.5 | 2.18 |
| 7 | 1.05:1.0:1 | 60 | 56.8 | 78.9 | 72.0 | 2.77 |
| 8 | 1.05:3.6:1 | 120 | 12.2 | 61.5 | 15.6 | 1.00 |
| 9 | 1.05:3.6:1 | 70 | 12.2 | 61.5 | 15.6 | 1.00 |
| 10 | 1.05:3.6:1 | 25 | 12.2 | 61.5 | 15.6 | 1.00 |

Fig. 2

Table 2. Sodium acetanilide in different solvents

| Test | Ratio AA:S:NaOMe | Solvation agent 8 | m(AA) [g] | m(S) [g] | m(NaOMe) [g] | c [mol/kg] |
|---|---|---|---|---|---|---|
| 11 | 1.05:10:1 | NMP | 12.3 | 85.6 | 15.6 | 0.91 |
| 12 | 1.05:4:1 | N-cyclohexylpyrrolidone | 12.3 | 57.8 | 15.6 | 1.24 |
| 13 | 1.05:4:1 | N-dodecylpyrrolidone | 12.3 | 87.5 | 15.6 | 0.87 |
| 14 | 1.05:4:1 | N-hexylpyrrolidone | 12.3 | 58.5 | 15.6 | 1.22 |
| 15 | 1.05:4:1 | tert-butylpyrrolidone | 12.3 | 48.8 | 15.6 | 1.47 |
| 16 | 1.05:2.5:1 | TBH | 27.9 | 139.6 | 35.4 | 1.15 |
| 17 | 1.05:4:1 | DMEU | 12.3 | 39.6 | 15.6 | 1.71 |

Fig. 3

Table 3a. Polymerisation of LC12 with the catalyst system NaAA/NOP and different activators

| Test | Activator | Proportion of cat. [% by wt] | Tu [s] | Pn | T [°C] | t [min.] | η$_{rel}$ | LC12 extract [%] |
|---|---|---|---|---|---|---|---|---|
| 18 | Cyl | 2.5 | 8 | 200 | 200 | 15 | 2.12 | 0.14 |
| 19 | ID | 2.5 | 4 | 200 | 200 | 15 | 3.06 | 0.15 |
| 20 | DCC | 2.5 | 168 | 200 | 200 | 30 | 1.87 | 0.14 |
| 21 | S7000 | 2.5 | 133 | 200 | 200 | 30 | 1.90 | 0.14 |

Table 3b. Monomer casting of LC12 with the catalyst system NaAA/NOP, activated with S7000

| Test | Activator | Proportion of cat. [% by wt] | t [min.] | η$_{rel}$ | mp. [°C] |
|---|---|---|---|---|---|
| 22 | S7000 | 1.5 | 15 | 2.492 | 178 |
| 23 | S7000 | 1.8 | 15 | 2.372 | 178 |
| 24 | S7000 | 2.5 | 30 | 2.142 | 179 |

Fig. 4

Table 4. Polymerisation of LC12 with the catalyst system NaAA/NOP without activator

| Test | Prop. cat. [% by wt] | $P_n$ | T [°C] | t [min.] | $\eta_{rel}$ | LC12 extract [%] |
|---|---|---|---|---|---|---|
| 25 | 4.36 | 100 | 280 | 8 | 1.711 | 0.18 |
| 26 | 2.93 | 150 | 280 | 10 | 1.963 | 0.19 |
| 27 | 2.20 | 200 | 280 | 13 | 2.149 | 0.20 |
| 28 | 1.76 | 250 | 280 | 16 | 2.458 | 0.20 |
| 29 | 1.47 | 300 | 280 | 20 | 2.540 | 0.21 |
| 30 | 1.10 | 400 | 280 | 30 | 3.041 | 0.22 |

Fig. 5

Table 5. Polymerisation conditions for Cla-6 and analysis results

| Test | $P_n$ | Prop. cat. [% by wt] | T [°C] | t [min.] | $\eta_{rel}$ | Cla extract [%] |
|---|---|---|---|---|---|---|
| 31 | 300 | 2.58 | 230 | 135 | 2.54 | 7.3 |
| 32 | 500 | 1.55 | 230 | 150 | 3.34 | 7.1 |
| 33 | 200 | 3.87 | 250 | 60 | 1.96 | 7.9 |
| 34 | 200 | 3.87 | 280 | 20 | 1.79 | 9.4 |

Fig. 6

Table 6a. Synthesis of potassium acetanilide KAA

| Test | Molar ratio AA:NOP:KOMe | M(AA) [g] | M(NOP) [g] | M(NaOMe) [g] | C [mol/kg] |
|---|---|---|---|---|---|
| 35 | 1.05:3.6:1 | 71.0 | 394.0 | 89.1 | 1.029 |

Table 6b. Polymerisation of LC12 with potassium acetanilide KAA

| Test | $P_n$ | Prop. cat. [% by wt] | T [°C] | t [min.] | $\eta_{rel}$ | LC12 extract [%] |
|---|---|---|---|---|---|---|
| 36 | 200 | 2.46 | 280 | 30 | 2.071 | 0.25 |
| 37 | 300 | 1.64 | 280 | 30 | 2.483 | 0.26 |

Fig. 7

Table 7. Direct polymerization of LC12 on a double-shaft extruder with NaAA in NOP

| Test | $P_n$ | c(cat) [mol/kg] | Prop. cat. [% by wt] | $\eta_{rel}$ | LC12 extract [%] |
|---|---|---|---|---|---|
| 38 | 150 | 0.915 | 3.64 | 1.908 | 0.12 |
| 39 | 165 | 1.125 | 2.66 | 1.952 | 0.25 |
| 40 | 180 | 1.125 | 2.44 | 2.195 | 0.27 |
| 41 | 200 | 1.125 | 2.20 | 2.253 | 0.28 |
| 42 | 220 | 1.125 | 2.00 | 2.196 | 0.26 |

CATALYST SOLUTION FOR IMPLEMENTING ANIONIC LACTAM POLYMERIZATION, METHOD FOR PRODUCTION THEREOF AND POLYAMIDE MOULDING COMPOUND

BACKGROUND OF THE INVENTION

The invention relates to a solution of an alkali salt, which is strongly basic, clear, stable in storage and liquid at room temperature, of aniline, which is amidated with a monocarboxylic acid, or its derivatives in an aprotic solvation agent, a method for production thereof and the polyamides produced with this solution.

Various developments have become known recently for accelerated anionic lactam polymerisation, which use so-called liquid systems in order to initiate the lactam polymerisation. A liquid multi-component system of this type for the implementation of anionic lactam polymerisation is described in DE 196 03 305 C2. This system essentially comprises sodium caprolactamate which contains lactam-acylating compounds and solvation agents.

It has thereby been shown that systems of this type have only a limited storage life.

A liquid system is likewise described in WO 01/46293 A1 which, in contrast to the system of DE 196 03 305 C2, is lactam-free. This liquid system thereby contains a conversion product of isocyanate with a protic compound and a base in an aprotic solvation agent. It has been shown that this solution has in fact improved stability in storage relative to the solutions known to date in the state of the art, however it has been established with these liquid systems that they always exhibit discolouration to various extents. It is hereby particularly unfavourable that, when storing these solutions, this discolouration is intensified and, when this solution is used, the result can be discolouration of the produced polyamides.

Starting herefrom, it is therefore the object of the present invention to make available an improved liquid system for anionic lactam polymerisation which, in addition to good stability in storage, has an invariable inherent colour which remains constant also for the duration of the storage. The liquid system should furthermore be easily producible and environmentally safe. A further object of the invention is to indicate a method for producing systems of this type and the polyamides produced with the liquid system.

SUMMARY OF THE INVENTION

The invention can be achieved, with respect to the liquid system, by a catalyst solution for implementing anionic polymerization of lactones and/or lactams, containing a salt dissolved in an aprotic solvation agent S of at least one compound of the general formula I

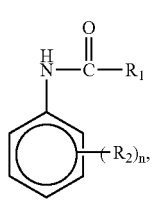

I wherein $R_1$ is H or an aliphatic, cycloaliphatic or aromatic radical with 1 to 12 C atoms which can also have heteroatoms or hetero groups and the radical $R_2$, which can be the same or different, is selected from H, halogen, $C_1$–$C_5$-alkyl, ethoxy and methoxy and n=1, 2 or 3. A method for producing this catalyst solution can include the deprotonation of the compound of the general formula I in the solvation agent (S) by adding a base (B). A polyamide moulding compound, according to the invention, can be produced by continuous or discontinuous anionic polymerization of lactam and/or lactone, wherein the above a catalyst solution was distributed homogeneously in the melt and the polymerization was implemented with suitable temperature control. Additional features according to the present invention can be found described herein.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 is a chart showing sodium acetanilide in NOP in varied concentrations;

FIG. 2 is charts sodium acetanilide in different solvents;

FIG. 3 shows the charts 3a and 3b, wherein 3a is a chart of the polymerization of LC12 with the catalyst system NaNN/NOP and different activators and 3b is a chart showing monomer casting of LC12 with the catalyst system NaAA/NOP activated with S7000;

FIG. 4 is a chart showing the polymerization of LC12 with the catalyst system NaAA/NOP without an activator;

FIG. 5 is a chart showing polymerization conditions for Cla-6 and analysis results;

FIG. 6 shows the tables 6a and 6b wherein table 6a shows results of the synthesis of potassium acetanilide KAA and chart 6b shows the polymerization of LC12 with potassium acetanilide KAA; and FIG. 7 shows a chart of results of the direct polymerization of LC12 on a double shaft extruder with NaAA in NOP.

DESCRIPTION OF THE PREFERRED EMBODIMENTS

The liquid system according to the invention, described subsequently as catalyst solution, contains an alkali salt of aniline, which is amidated with a monocarboxylic acid, or its derivatives in an aprotic solvation agent. The amidated aniline used according to the invention or its derivatives can also be described by the subsequent general formula I.

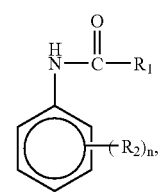

I

In the case of the compound of the general formula I, $R_1$ is thereby H or an aliphatic, cycloaliphatic or aromatic radical with 1 to 12 C atoms which can also have heteroatoms or hetero groups. In the case of the radical $R_1$, in particular those are preferred which are produced during the amide formation with acetic acid, formic acid, propionic acid and the homologues of cyclohexanecarboxylic acid and benzoic acid. The radical $R_2$, which can be the same or different, is thereby selected from H, halogen, C1- to C5-alkyl, ethoxy and methoxy, n is thereby 1, 2 or 3. Amongst halogens, in particular fluorine, chlorine or bromine are possible. Corresponding derivatives of aniline are well-known compounds.

There are used as solvation agents (S), polar, aprotic compounds of the cyclic carboxamide type with in particular 5 to 7 ring members, and also urea derivatives which can also be cyclic and also mixtures thereof. The nitrogen atoms of both compound classes are hence completely alkylated respectively at the N. In the case of cyclic carboxamide, these are alkyl groups with e.g. 1 to 12 C atoms, the radicals also being able to contain hetero groups. In the case of urea derivatives, these are tetraethyl and tetrabutyl urea and the cyclic urea derivatives which are methylated once respectively on one —N— and the N atoms, integrated via an ethylene or a propylene bridge, are bonded to each other and carry the normal designation dimethylethylene- and dimethylpropylene urea. Because of the synthesis control and the resultant properties, the compounds of these product classes which have a boiling point above 200°, in particular above 240° and especially above 280°, are thereby particularly preferred. In the case of cyclic carboxamides, representatives of these product classes, in the case of the pyrrolidones, are N-methyl, -ethyl, -isopropyl, -butyl, -t-butyl, -hexyl, -octyl, -dodecyl, -cyclohexyl, -2-methyoxyethyl and -3-methyoxypropylpyrrolidone. An especially well suited compound is in addition N-octylcaprolactam. In addition to the cyclic representatives, in addition tetraethyl- and tetrabutyl urea are suitable solvation agents. A multiplicity of these compounds is described in the 1996 edition of BASF Intermediates by the BASF Company, Ludwigshafen. Especially suitable cations are sodium and potassium.

The solution of the sodium and of the potassium salt of acetanilide in N-octylpyrrolidone (NOP) and tetrabutyl urea (TBH) in a molar concentration of approx 0.3–3.0 mol/kg of solution is particularly preferred. In particular this catalyst solution has a superior stability in storage of approximately 12 months without the inherent colour and its activity being substantially changed.

The solution according to the invention can be produced such that the alkali salt of a compound of the general formula I, which is produced in advance as a solid material, dissolves directly in the solvation agent. A production method for the solid sodium salt, e.g. of acetanilide, which is required for this purpose, is described in WO 00/58378.

Surprisingly, and in contrast to previous knowledge, it has been shown that the deprotonation of e.g. acetanilide is possible directly in solution in the described solvation agent (S) using e.g. alkalimethylate solution at 30° to 130° C., preferably at 50° to 70° C. Surprisingly, deprotonation can be implemented also under significantly milder conditions, preferably at a temperature of 50° C. It is thereby advantageous that no intermediate products need be isolated and the solution according to the invention with a good inherent colour is formed directly. As a base for the deprotonation, it is possible to use normal compounds which are suitable therefore and act in a strongly basic manner, such as e.g. sodium hydride, metallic sodium, sodium amide but in particular the 15 to 40%, in particular 30% solution, often used in the art for such reactions, of sodium methylate in methanol or correspondingly also a methanolic solution of potassium methylate in methanol.

Whilst for the deprotonation of normal, aliphatic carboxamide, such as e.g. N-dodecylacetate and caprolactam, a temperature of at least 80°, but in particular of 120° to 130° C., is required, it has been shown unexpectedly that the deprotonation of acetanilides can be readily implemented with the normal alkalimethylate solution —Na, K— already, as explained, at 50° and at a pressure of e.g. 10 to 30 torr and, in contrast to the deprotonation of aliphatic carboxamide, also no precipitate thereby occurs.

The solution according to the invention is suitable in particular as catalyst for anionic polymerisations, such as e.g. of lactones, lactams and double-bond-containing monomers.

In comparison to the state of the art, a substantial advantage resides thereby in the fact that it is a liquid which is stable in storage at room temperature and is easy to handle, said liquid being able to be distributed therefore readily and rapidly in the monomer and consequently initiating the polymerisation very uniformly.

In comparison to the known solid material solutions of deprotonated caprolactam, the solution according to the invention which is liquid at room temperature is stable in storage for months—without supplements requiring to be used also—and its sensitivity relative to occasional air entry, i.e. its tendency to slagging, is small. In the case of addition in a molar quantity of e.g. 0.3–3.0% to liquid lactone, such as e.g. caprolactone or also to double-bond-containing monomer, the anionic polymerisation reaction is initiated already at room temperature and proceeds rapidly. The solution according to the invention is outstandingly suitable in particular however for the polymerisation of lactams.

It can thereby be used alone, without the addition of an accelerator, which offers advantages for example in the polymerisation of LC-12.

The solution according to the invention is suitable for continuous and for discontinuous polymerisation processes. If it is used for example in a monomer casting process of LC-12, then its addition to the lactam melt can be effected for example at 220°, as a result of which the time necessary for the homogeneous distribution of the solution in the lactam melt is ensured. Thereafter the temperature can be raised, as a result of which the conversion can be accelerated to the desired extent.

In addition, the solution is especially suitable for the production of composite materials, e.g. based on roving fabric. The rovings thereby always contained size, one component of which is in general a silane, which can contain e.g. the isocyanate or also the thermally more stable isocyanurate structure in order to achieve compatibility with the matrix. If the lactam melt which is made basic by means of the solution according to the invention now covers such especially silanised structures, then the anionic lactam polymerisation is initiated in an accelerated fashion by these reactive centres which directly acylate the lactam—isocyanate, isocyanurate—and the polylactam chains are fixed chemically directly on the filler.

This novel concept is of course also suitable for correspondingly silanised fillers of any type and their combination with glass fibre structures.

The solution according to the invention is however also outstandingly suitable for continuous polymerisation processes, in particular of LC-12, such as e.g. for the continuous polymerisation on a double-screw extruder, such as e.g. on a ZSK of Werner and Pfleiderer, Stuttgart.

The process can thereby start from an LC melt or also directly from lactam in pill form which is supplied to the extruder feed. During feeding of the extruder with lactam melt, the continuous addition and homogeneous mixing of the solution according to the invention must be effected in a defined and constant molar proportion in order to initiate the polymerisation and allow it to proceed. It can be added to the lactam melt flow, even already in an intensive mixer prior to metering into the extruder, or else also directly in the feed part of the extruder. Of course then the measures corresponding to the state of the art must be met for a suitable polymerisation process. For example, the temperature of the melt and the residence time must therefore be correspondingly adapted.

It is a relevant advantage when using the solution according to the invention that pure, non pre-activated or altered lactam, free of additives, can be used directly and that the polymerisation can be initiated directly to suit via suitable addition of the solution. Consequently, the technical equipment measures are also substantially simplified because there is no requirement for lactam melt vessels which have to be heated and rendered inert for the separate preparation and storage of activator- and catalyst-containing lactam-melt.

However, it has been shown in particular that the solution according to the invention is readily suitable for the polymerisation of lactams and in particular of lactam 12. In addition, it has been shown that interesting modifications and combination options exist.

Hence, for example the solution according to the invention can be substantially extended in its application breadth via selected supplements.

For example stabilisers can be added to the solution according to the invention. Stabilisers which do not impair or only insubstantially impair the anionic polymerisation of lactam and cause no discolouration being preferred. It has been shown that so-called HALS stabilisers are used thereby preferably, such as e.g. the so-called Nylostab S-EED of the Clariant Company or else HALS stabilisers of the Ciba SC Company, such as e.g. Tinuvin 765 and Tinuvin 770 or also Tinuvin 123 or also the light stabiliser Tinuvin 312 and selected mixtures of accelerators with stabilisers. Nylostab S-EED and Tinuvin 312 can also be used in their deprotonated salt form and the deprotonation can thereby also be implemented together with the acetanilide directly in the solvation agent.

In order to influence the polymerisation process, it is also possible to supply selected additives together with the lactam to the extruder or also to dissolve them already prior to the polymerisation process in the lactam melt, this being for example accelerators and stabilisers for the polymer.

Isocyanate, carbodiimide or even already acylated lactam are thereby possible as accelerators. Examples are: cyclohexylisocyanate, phenylisocyanate, tolylisocyanate, chlorinated phenylisocyanate, isophorone diisocyanate or dicyclohexylcarbodiimide.

The solution according to the invention can be used in various ways in discontinuous polymerisation processes of lactam. The solution according to the invention is thereby added to the lactam, e.g. in a molar proportion of approx. 0.2 to 3.0% of the active component, in particular the alkali salt of acetanilide. If the formulation of the solution and the process conditions are chosen such that the polymerisation is initiated slowly, the solution can be added and mixed in for example in a predetermined volume proportion, and this activated lactam melt can then be supplied to the shaping process. These processes can thereby be for example: monomer casting, rotational casting, centrifugal casting, immersion and spraying processes and the wetting and coating of fibre structures in a mould with subsequent polymerisation into composite material parts, combinations with inert fillers, such as minerals, also being possible. Consequently, corresponding to the known state of the art, properties which are desired in the cast part, such as increased rigidity, resistance to fracture and dimensional stability can be achieved. Such cast parts can hence be outstandingly suitable as high-quality construction parts, e.g. load-bearing components in automobile construction. The especially interesting possibility thereby exists of chemically coupling the polylactam matrix directly to the filler and the chosen fibre reinforcing structure and hence of improving the mechanical behaviour and the durability of such application components in a relevant manner. This is effected preferably such that, for the surface treatment, e.g. of the mineral filler and with respect to the silane component in the case of glass fibre and roving production according to known technology, but in a new concept a silane is used which contains an acylating group for lactam, such as e.g. isocyanate, —NCO or the more stable isocyanurate form, as a result of which the accelerated anionic lactam polymerisation of the already basic lactam melt is initiated directly at the filler surface. In the case of this special process variant, the solution according to the invention is added to the lactam melt without the accelerator, but for example jointly containing stabilisers and colouration agents for the polymer.

A suitable filler for the anionic casting process of lactam is e.g. magnesium hydroxide which exerts a fire-inhibiting effect when flame-treating a component.

The fact that a catalytically acting solution, which is stable in storage, is available according to our invention and which solution can be modified in various ways and can be adapted to the processing methods, opens new possibilities for new applications and product properties. In the case of casting processes for composite material production, it is a relevant advantage that the lactam melt can be mixed firstly with pure, catalytically acting solution, said melt firstly polymerises only slowly with suitable temperature adjustment so that sufficient time is available for homogeneous and complete wetting of any type of filler and reinforcing material/reinforcing structures in a mould, but then, after contact of the melt with the activating solid material surface, the accelerated polymerisation is effected whereby directly coupling of the polylactam matrix to the structure occurs.

This applies also to spraying and immersion processes, whereby the surface of the parts has to be coated with an acylating silane. Silanes for this pre-treatments are the state of the art. These are for example the types Silquest A 1310 with —NCO and Y 11597 with the isocyanurate group as functional groups which accelerate the polymerisation, i.e. acylate the lactam. Such silanes are produced for example by the company General Electric in CH 1217 Meyrin. The conversion product of the NCO group in the silane with lactam 6 is also described already as Degussa silane SE 254.

Process variants are hence opened up, in that Lactam melt can for example be pre-mixed with catalytically acting solution, then pre-treated filler and/or fibre structures in a mould can hence be impregnated, after which the accelerated anionic polymerisation proceeds on from the filler surface, and the polymerisation can be ended with suitable temperature control.

The possibilities of activation of the casting processes can of course also be combined. Hence an additionally suitably activated lactam melt can be used and filler and/or the glass fibre structures can be used, that are silanised with silane, containing an acylating function. So it is consequently ensured that the entire PA12 matrix proportion is completely converted into the polylactam and coupled to the filler.

The solution according to the invention is suitable in particular also for the continuous implementation of polymerisation processes, e.g. of lactone, but in particular also of lactam in the extruder, e.g. in a double-screw extruder, e.g.

ZSK types, such as for example of the company Werner and Pfleiderer, Stuttgart, DE which offer various method possibilities.

For the polymerisation of LC-12, LC-12 can be thereby supplied continuously to the extruder in pill form, and the catalyst can thereby be supplied continuously into one of the first extruder housings, the lactam then being present already as a melt or still as a solid material. The extruder can however also be fed directly with lactam melt, the melt being activated thereby with the catalyst preferably in one of the first extruder housings. There are however various variation possibilities for the addition of the catalyst solution to the lactam melt. Hence, the solution can be added to the LC melt already in a preceding process step, a homogeneous mixing requiring to be sought. There are suitable for this purpose e.g. so-called static mixers, as for example the company Sulzer, Winterthur provides or also mixing heads provided with a rotor as for example the company Dosiplast in Balzers, FL. produces. If pure catalyst solution, according to the invention, is thereby used and a temperature of the melt below 230° is chosen, then the polymerisation proceeds initially so slowly that the risk of a substantial polymerisation already in the mixing system exists. The polymerisation of the lactam can then be accelerated by temperature increase and hence the required dwell time in the polymerisation zone of the extruder can be shortened.

It is however also possible to mix a catalyst solution, which already contains activator and if necessary further additives, such as e.g. stabilisers, in a preceding method step with the lactam melt. However, the requirements with respect to homogeneous mixing and for the dwell time until extruder feeding are thereby higher, and in particular the choice of method parameters, such as percentage metering of this solution to the Lactam-melt and the temperature control, must be maintained more highly and more strictly.

However, there are also embodiments of the method where it is necessary with respect to the method and desired that for example a low viscosity melt is present in the first extruder housings. This is the case for example when fillers, such as e.g. graphite particles or also cut glass-fibre strands or glass fibre rovings or fine-particle minerals or combinations thereof, must be distributed homogeneously in a polylactam matrix with good wetting. In the case of such method variants, the extruder is fed for example simultaneously with the catalyst-containing lactam melt and with the additives and the temperature is thereby controlled so that firstly the complete wetting of the supplements with the lactam melt can be effected and the temperature is increased subsequently so that the polymerisation is accelerated to the required degree. However the fillers can also be metered in one of the first extruder housings into the still low-viscosity and wetting-active lactam melt which already contains the catalyst.

As a variant, an activator, e.g. in dissolved form, can be supplied separately to the melt after complete wetting of the supplements has been effected, and the polymerisation can be accelerated consequently to the required degree or the catalyst can be added also alone or with the activator only after wetting of the filler has been effected.

In all these process variants, it is a matter of course that the chosen supplements are suitably selected according to the possibilities of the anionic polymerisation process and in particular must be dry, the process steps being implemented also as far as possible under protective gas, e.g. in a nitrogen atmosphere.

Even with continuous polymerisation processes, e.g. in a ZSK, it is advantageous to use fillers which are suitable for this purpose and are pre-treated with a reactive silane with the lactam-acylating functional group like isocyanate and isocyanurate. If a catalyst-containing or additionally activator-containing melt is thereby used for the polymerisation, then the chemical coupling of the filler to the matrix is additionally ensured.

So continuous polymerisation with forced conveyance, e.g. in the extruder, can be implemented using an LC melt which contains exclusively the catalyst solution, but also additionally containing activator as part of the solution or which is added later separately for the purpose of later acceleration of the polymerisation process, e.g. after a wetting step has been effected. Of course, all such process variants can be suitably combined according to requirement.

The resulting polylactam melt can also be subjected directly to further process steps, for instance by addition of a compound which specifically eliminates the activity and the basicity of the catalyst and consequently stabilises the melt for further process steps, and also by addition of special property additives, like plasticizers, fire retardants, fillers and reinforcing agents, other polymers, like impact-modifiers or by combining all these additives. Further additives are for improving the processability and the stability (heat, light, hydrolysis) and the surface quality and dyes and pigments and of course combinations of all the described additives. Such a melt can then also be supplied directly for shaping steps, like the continuous production of pipes, profiles or coverings, also in combination with other polymers, e.g. into composite and multi-layer systems.

The polylactam produced using the catalyst solution according to the invention is thereby distinguished by a combination of properties which is previously unknown. This is caused by the fact that it is free of the functionality (functional end group)-COOH, which is otherwise present in polyamide and reduces in particular the hydrolysis stability in practical use. At the same time, it has the functional group —$NH_2$, specifically only at one chain end. Directly after polymerisation has been effected, its melt is strongly basic corresponding to the equivalent proportion of added catalyst solution. If now the catalyst is neutralised with a suitable neutralisation agent, preferably in the stoichiometric 1:1 ratio to the catalyst, then its melt is still basic, which facilitates hydrolysis-stable formulations on using further stabilizing additives.

Thereafter, the $NH_2$ groups are furthermore available in particular for varied matrix behaviours. Thus, reactive impact modifiers, such as for example MA grafted copolyolefins can react with the amine function of the matrix without cross-linking being able to occur, as occurs easily with normal hydrolytic polyamide, which is chain length-regulated, e.g. with normal diamine such as hexanediamine, and thereby leads for example to the formation of specks.

Even in the case of technical applications where composite adhesion is necessary, such as e.g. in multi-layer propellant systems in combination with further polymer, this novel polyamide matrix is outstandingly suitable, in that the amino groups produce the necessary adhesion, cross-linking effects being however simultaneously prevented because one chain end is not reactive.

Also because of the described possibility for jointly using activators in a broad range according to choice, the matrix properties can be specifically adapted to practical requirements.

If e.g. a monoisocyanate is thereby used as accelerator in a stoichiometric proportion to the catalyst, then polyamide chains result in practice without functional end groups, which are of good melt-flow and are not subject to side reactions which can influence the matrix properties substantially. If the activator is polyfunctional, e.g. a di- or even a triisocyante, then high molecular weights or even branched polylactam chains can be produced easily and reproducibly. Hence, when using the catalysts according to the invention and in combination with further selected additives, especially desired matrix properties can be achieved like hydrolysis- and weathering stability.

The invention is now intended to be described with reference to examples.

In the examples, the following mean:

| Abbreviation | Description |
|---|---|
| Na | sodium |
| AA | acetanilide |
| NaAA | sodium acetanilide |
| S | solvation agent |
| NOP | n-octylpyrrolidone |
| NMP | n-methylpyrrolidone |
| DMEU | dimethylethylene urea (cyclic) |
| TBH | tetrabutyl urea |
| NaOMe | sodium methylate as 30% solution in methanol |
| MeOH | methanol |
| Cyl | cyclohexylisocyanate |
| DCC | dicyclohexylcarbodiimide |
| S 7000 | stabiliser 7000 (Raschig Co.), bis(2,6-diisopropylphenyl)carbodiimide |
| ID | isophorone diisocyanate |
| CLo-6 | caprolactone |
| CLa-6 | caprolactam |
| LC-12 | laurinlactam |
| concentration | calculated concentration of catalyst in the solvation agent in mol/kg |
| molar ratio | molar ratio of the used educts |
| t | polymerisation time in min. |
| T | polymerisation temperature in ° C. |
| $P_n$ | calculated polymerisation degree |
| extract | the residual proportion of non-converted lactam in % by weight, which can be extracted with boiling methanol |
| $\eta_{rel}$ | relative solution viscosity of the polylactam, measured as 0.5% solution in mcresol |
| Tu | time after which the viscosity of the activated lactam melt increases such that a magnetic agitator comes to a halt. The viscosity increase is a measure of the chain growth. |
| Irgacore L190 | a trifunctional, cyclic carboxylic acid with 6N atoms in the molecule (Ciba SC) |

COMPARATIVE EXAMPLE

Synthesis of sodium-N-dodecylacetamide in NOP 866.32 g N-octylpyrrolidone were placed at room temperature in a well-dried apparatus rendered inert with nitrogen and subsequently 247.87 g N-dodecylacetamide were added in several portions. The resultant solution was then heated to 65° C. After reducing the pressure to 60 mbar, 186.26 g of a 30% NaOMe solution were added dropwise within 60 minutes and the released methanol was distilled off continuously. During the addition, the viscosity of the solution increased and precipitate formation began. After complete addition of the NaOMe solution, the pressure was dropped to 10 mbar and the reaction mixture was agitated at this pressure for one hour. The light orange-brown precipitate did not thereby dissolve. After heating the reaction mixture to 130–137° C., the precipitate dissolved completely. The vacuum was broken and the batch was cooled, whereby no precipitation occurred. After storing for 60 hours at room temperature, a precipitate began once again to be formed which however dissolved again completely by a temperature increase to 50° C.

Examples 1–10

Synthesis of Sodium Acetanilide, NaAA

The examples 1–10 in Table 1 (FIG. 1) describe the production of the liquid catalyst NaAA directly in the solvation agent NOP.

In all these examples, acetanilide AA was dissolved in the solvent NOP and quantitatively deprotonated by means of sodium methylate, NaOMe. The ratio AA:NaOMe was chosen to be 1.05:1, AA being used in a slight excess. The ratio AA/S was chosen in a range of 1:4.0 down to 1:1.0, the viscosity noticeably increasing with a lower solvent content. The concentration c increased correspondingly from 0.94 to 2.77 mol/kg. According to the application, the viscosity of the catalyst can be controlled in this way.

The tests for the synthesis of NaAA are compiled in Table 1. Before syntheses, the reactor system and the educts were carefully freed of water and traces of oxygen. Under inert gas, the acetanilide was firstly dissolved in the solvent NOP with agitation at a temperature of 60° C. Subsequently, sodium methylate (30% solution in methanol) was added dropwise and methanol was simultaneously distilled off continuously at 160 mbar. Subsequently, the vacuum was reduced to 60 mbar for about 2 hours. According to the batch size, the vacuum time had to be adapted such that the residual methanol was completely removed. After cooling to room temperature, the deprotonated product sodium acetanilide in NOP was a clear, colourless to slightly yellowish solution.

The synthesis of NaAA in NOP could be implemented without special measures in larger batches of 40, 50 and 100 kg. The reaction time had to be extended because of the smaller surface/volume ratio in the larger reactor vessel.

It was shown that the colour of the catalyst depends mainly of the reaction temperature at which the deprotonation is implemented. The higher the temperature was chosen, the darker was the inherent colour of the product (example 8 and 9). The optimal reaction temperature is approximately 60° C., the product has on the one hand a good colour with a colour index according to Gardner of approximately 5 units, on the other hand the distillation of the methanol is still readily possible. At temperatures below 60° C., the deprotonation proceeds slowly and requires a proloonged time. Example 10 shows the reaction at room temperature, the deprotonation did not proceed, the activation energy was obviously not sufficient.

Examples 11–17

Sodium Acetanilide in Different Solvents

The examples 11–17 in Table 2 (FIG. 2) describe the synthesis of NaAA in different solvation agents, and in fact in the pyrrolidones NMP, n-cyclohexylpyrrolidone, n-dodecylpyrrolidone, n-hexylpyrrolidone and tert-butylpyrrolidone and in the ureas DMEU and TBH. The syntheses procedure was analogously to example 1. AA was dissolved in the relevant solvation agent and the sodium-methylate solution added dropwise under vacuum, whereby methanol distilled off. The AA was again used in a slight excess. The catalysts were all obtained as a clear, colourless to brown solution.

Examples 18–24

Polymerisation of NaAA with Different Activators

The examples 18–21 are cited in Table 3a (FIG. 3) and describe the polymerisation of lactam-12 with NaAA in NOP activated with different activators, the ratio catalyst/activator always being 1:1. All polymerisations were implemented under the same conditions.

More or less discolouration from colourless to brown occurred with all catalyst-activator mixtures, said discolouration being very noticeably and rapidly in the case of S7000. It was shown that polymers with an optimal colour could be obtained if the relevant mixture was produced just shortly prior to the polymerisation.

Tests of the stability on storing NaAA in NOP in comparison to the system activated with CyI showed a significantly better stability. After 2 months, the Tu time had not changed, both during storage under inert gas in darkness and on normal oxygen contact and light. The colour index according to Gardner remained constant at 5.4.

The catalyst activated with CyI on the other hand had after the same time a Tu time which was 2 to 3 times the initial value. The colour of this activated system darkened more rapidly, the colour index according to Gardner increased in the same time scale without activator from 5.4 to 6.2 units, with activator from 5.6 to 8.7 units.

In order to determine the Tu time, LC-12 was melted in an Erlenmeyer flask under a dry inert gas atmosphere and was agitated with a magnetic agitator. After addition of the catalyst, the time was measured until the power of the stirrer drive was no longer able to keep the agitator rod in rotation.

For the determination of $\eta_{rel}$ and the LC-12 extract, LC-12 was polymerised in a heated glass tube under the same starting conditions as for the Tu test but until completion. Samples in the form of boring spans were removed from the polymer and analysed.

The polymerisation degree $P_n$ was set at 200 by the ratio monomer/catalyst, the temperature was 200° C. The catalyst/activator mixtures of examples 18 and 19 had Tu times of 8 or 4 s, hence activating with a high polymerisation speed, whilst the polymerisation began significantly more slowly in examples 20 and 21 with tilt of 168 s and 133 s. From these times, which characterise the starter activity of the catalysts, the conditions for polymerisations close to 100% conversion were derived. Therefore the polymerisation times for the slow systems of example 20 and 21 have to be longer. The polymers in example 18 and 19 had high relative viscosities of 2.12 and 3.06, in examples 20 and 21 values of 1.87 and 1.90 were achieved. All the polymers had low LC-12 extract values of approx 0.14% by weight. In particular the use of the bifunctional activator ID enables polymerisation to high molar masses or relative viscosities.

The activated catalyst, in particular NaAA/S7000, is outstandingly suitable for monomer casting (examples 22–24). For this purpose, preheating took place in a circulating air oven of a vessel with a height of 300 mm and a diameter of 84 mm for 180 minutes at 210° C. and subsequently, a mixture of LC-12, NaAA and S7000 (molar ratio NaAA/S7000=1:0.875) of a volume of 1100 ccm was filled in from the top by means of a metering unit for monomer casting (Dosiplast Co.) operation with a dynamic mixing head and a conveying power of 600 ccm/min. The polymerisation was implemented within 120–135 min. at a tool temperature of 212° C. and a resulting product temperature of 207–210° C. FIG. 3 (Table 3b).

Example 25–30

Polymerisation of LC-12 with the Catalyst System NaAA/NOP without Activator

In the examples 25 to 30 in FIG. 4, Table 4, pure NaAA in NOP was used as catalyst. The polymerisations therefore had to be implemented at 280° C. since a higher activation energy was required. Polymerisation degrees of $P_n$=100–400 were set by means of the monomer-catalyst ratio and polymers of colourless to yellowish colour were obtained with values for $\eta_{rel}$ of 1.711 to 3.041 and LC-12 extracts between 0.18 and 0.22%.

Examples 31–34

Polymerisation of CLa-6

In examples 31 to 34 in Table 5 (FIG. 5), caprolactam CLa-6 was polymerised with the catalyst NaAA in NOP. The polymerisation degree $P_n$ was respectively adjusted by the ratio of catalyst to monomer. According to Table 5, polymerisation was performed to $P_n$ of 200 to 500 and temperatures of 230 to 280° C., the polymerisation mixture foaming greatly at 280° C. The polymerisation time was chosen so that the polymerisations took place to equilibrium conversion. Relative viscosities between 1.79 in example 34 and 3.34 in example 32 were obtained. The Cla-6 extract contents varied between 7.1 and 9.4% by weight.

Example 31

Polymerisation of Caprolactone CLo-6

The polymerisation of CLo-6 with NaAA in NOP showed that the reaction takes place extraordinarily rapidly at increased temperatures so that thorough mixing of the catalyst with the lactone melt was not possible. Hence the polymerisation was implemented at room temperature and a rapid, strongly exothermic reaction was observed. Polymers with a yellowish inherent colour were obtained.

Example 35

Synthesis of KAA in NOP

The synthesis of KAA was effected analogously to NaAA. Under inert gas, the acetanilide was dissolved in the solvent NOP with agitation at a temperature of 60° C. Subsequently, potassium methylate KOMe (25% solution in methanol) was added dropwise and methanol was simultaneously distilled off continuously at 160 mbar. Subsequently, the vacuum was reduced to 60 mbar for further 2 hours. According to the batch size, the evacuation time had to be adapted such that the residual methanol was completely removed. After cooling to room temperature, the deprotonated product potassium acetanilide KAA in NOP was obtained as a clear, slightly yellowish solution. The synthesis conditions are compiled in Table 6a (FIG. 6). The ratio AA:NOP:KOMe was chosen to be 1.05:3.6:1. A catalyst mixture with a concentration of 1.029 mol/kg was obtained.

Examples 36 and 37

Polymerisation of LC-12 with Potassium Acetanilide KAA

In examples 36 and 37, see FIG. 6, Table 6b, laurinlactam LC-12 was polymerised with the catalyst KAA in NOP. The polymerisation degree $P_n$ was set at 200 and 300 by the ratio catalyst to monomer. The polymerisation was implemented as in examples 25–30. Polymers were obtained with $\eta_{rel}$=2.071 and 2.483 and LC-12 extracts of 0.25 or 0.26%.

Examples 38–42

Continuous Polymerisation of LC-12 with Sodium Acetanilide NaAA

It was tested as to whether the catalyst according to the invention is suitable for the continuous lactam-12 polymerisation on a double-screw extruder. For this purpose, a pilot plant extruder of the company Werner and. Pfleiderer, Stuttgart, type ZSK-25, was fitted with a usual compounding screw and provided with a boring in the housing 2 for the continuous metering of the liquid catalyst. Thereafter, the mixing and the polymerisation zone follow with mainly conveying elements of the screw. For the course of the polymerisation, the catalyst was metered by means of a continuously conveying pump into the extruder zone 2.

Dried lactam-12 in pill form was metered to the inlet of the extruder, corresponding to a throughput of 12 kg/h, and in zone 1 and 2 the temperatures setting was of 10 and 100° C. Thereafter, the set temperature settings were kept constant at 310° C. The speed of rotation of the extruder screw was respectively 120 revolutions per minute.

The results in FIG. 7, Table 7 show that the catalyst NaAA according to the invention is suited excellently for the continuous lactam polymerisation. Low residual lactam values of approximately 0.2 to 0.3% are obtained which are significantly below the values that result by the hydrolytic lactam polymerisation. The relative viscosities for $P_n$=150–220 are between 1.908 and 2.196.

Furthermore, it proofed to be advantageous that the anionically produced PA12 was neutralised by means of a deactivator since basic PA12 is subjected during processing via the melt state to significant viscosity variations, in particular chain length degradation. For this purpose, the polymer was converted during compounding in addition with a deactivator, for example with Irgacore L190 from the company Ciba SC, Basel, in order to neutralise the basicity introduced by the catalyst.

The proportional quantity of deactivator was calculated stoichiometrically so that one basic amino group of the polymer chain was converted with one proton of Irgacore L190. Simultaneously, additives were added, such as heat stabilisers, plasticizers and impact modifiers in order to process the resultant PA12 subsequently into pipes. The pipes showed similarly good mechanical test results as the hydrolytically polymerised comparative material.

The polymerisation in the extruder could be implemented likewise very readily with the activated catalyst NaAA/CyI. For this purpose, NaAA was mixed prior to polymerisation with CyI in the ratio 1:1 and the mixture was metered into the extruder. The temperature of the extrusion zones was set at 240 and 260° C., the throughput was 12 kg/h. The polymerisation degrees $P_n$ were set in a range of 180 and 220 by the ratio catalyst/monomer and residual lactam concentrations of less than 0.3% were obtained. The relative viscosities of 1.97 to 2.08 and 2.13 correlated well with the $P_n$.

The anionic PA12 polymers produced in this way can be neutralised well with Irgacore L190 and compounded with additives, such as stabilisers, plasticizers and impact modifiers, whereby granulates result which can be readily shaped thermoplastically for example into pipes, which correspond in their properties well with pipes based on hydrolytically produced PA12.

Example with Comparative Example for Ageing Liquid Catalysts

In order to compare the sensitivity of the newly developed catalysts with the state of the art, as is described in EP 0 872 508 B1, a test and a comparative test was implemented as follows:

A liquid catalyst activated directly during the synthesis according to the state of the art (catalyst LA4 according to EP 0 872 508 B1) containing in a molar ratio the components sodium caprolactamate to DCC to dimethylpropylene urea (DMPU) corresponding to 1.05:1:4.15 and a liquid catalyst according to the invention following example 2 were tested comparatively for their sensitivity to air contact. For this purpose, respectively 30 g of the catalysts were weighed into a 250 ml Erlenmeyer flask and stored at 23° C. and 55% relative humidity. Hourly assessment was now effected with the following result:

The catalyst according to the state of the art showed already after one hour storage the formation of a thin skin which could be mixed well into the remaining solution by agitating the Erlenmeyer flask. The superficial crust formation increased now by the hour so that the resultant solid material fractions were soon no longer soluble. This was the case at the latest after 5 to 6 hours with all samples.

The catalyst according to the invention on the other hand did not show indications of skin formation until after 5 hours and, only after 23 hours, first, but still small, no longer soluble, solid material fractions which gave the solution a slightly dull appearance, became visible.

After 24 hours storage, a reactivity test in the form of a batch polymerisation was implemented.

In the case of the catalyst LA4, the high solid material fraction and also the increased viscosity made it difficult to take samples from the remaining liquid part. The polymerisation was initiated by adding 2.2% by weight LA-4 to the lactam-12 melt heated to 200° C. The Tu time was 150 seconds.

Addition of the same molar quantity of catalyst according to the invention, which had been activated previously in the molar 1:1 ratio with cyclohexylisocyanate, initiated the polymerisation of lactam-12 at only 170° C. after 76 seconds (Tu time). The removal of the catalyst solution according to the invention also presented no problems after 24 hours storage in a humid environment and in addition the reactivity remained almost entirely unchanged.

For the storage and use of the catalysts, it is crucial that they are readily storable and are only slightly sensitive to air and moisture, which is the case outstandingly with the catalysts according to the invention.

The invention claimed is:

1. Catalyst solution for the anionic polymerization of lactones and/or lactams, comprising a salt of at least one compound of the general formula I

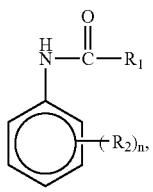

wherein $R_1$ is H or an aliphatic, cycloaliphatic or aromatic radical with 1 to 12 C atoms, the radical $R_2$, which is the same or different, is H, halogen, C1–C5-alkyl, ethoxy or methoxy, and n=1, 2 or 3, and wherein the salt is dissolved in an aprotic solvation agent S, wherein said solvation agent S comprises N-methylpyrrolidone, N-octylpyrrolidone, N-cyclohexylpyrrolidone, N-octylcaprolactam, tetrabutyl urea or mixtures thereof.

2. Catalyst solution according to claim 1, wherein, in the general formula I, $R_1$=$CH_3$ and $R_2$=H.

3. Catalyst solution according to claim 1, wherein the salt is a sodium or potassium salt.

4. Catalyst solution according to claim 1, wherein the solution has a molar concentration of said salt of 0.3 to 3.0 mol/kg.

5. Method for producing a catalyst solution according to claim 1, wherein the compound of the general formula I is deprotonated in the solvation agent (S) by adding a base (B).

6. Method according to claim 5, wherein the base is sodium, sodium hydride, a sodium alkoxide, a sodium amide, sodium hydroxide and/or sodium carbonate.

7. Method according to claim 6, wherein the base is a 15 to 40% solution of sodium methylate in methanol and the deprotonation is performed at 30 to 130° C.

8. Method according to claim 6, wherein the base is sodium methylate.

9. Method according to claim 7, wherein said base is a 30% solution of sodium methylate in methanol.

10. Method according to claim 7, wherein the deprotonation is performed at 50 to 70° C.

* * * * *